United States Patent
Krishnan et al.

(10) Patent No.: US 10,928,225 B1
(45) Date of Patent: Feb. 23, 2021

(54) VEHICLE SENSOR ASSEMBLY

(71) Applicant: Ford Global Technologies, LLC, Dearborn, MI (US)

(72) Inventors: Venkatesh Krishnan, Canton, MI (US); Raghu Raman Surineedi, Dearborn, MI (US); Matthew Dennis Smith Boswell, Ferndale, MI (US); Rashaun Phinisee, Ypsilanti Township, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/576,462

(22) Filed: Sep. 19, 2019

(51) Int. Cl.
*G01D 11/24* (2006.01)

(52) U.S. Cl.
CPC .................. *G01D 11/245* (2013.01)

(58) Field of Classification Search
CPC ................................... G01D 11/245
See application file for complete search history.

(56) References Cited

U.S. PATENT DOCUMENTS

| | | | |
|---|---|---|---|
| 5,199,762 A | 4/1993 | Scheele et al. | |
| 6,062,805 A | 5/2000 | Tremblay et al. | |
| 6,944,908 B2 | 9/2005 | Hoetzer et al. | |
| 9,834,180 B2 | 12/2017 | McConnell | |
| 9,863,866 B2 | 1/2018 | Bugher et al. | |
| 10,189,450 B2 | 1/2019 | Rice | |
| 10,268,038 B2 | 4/2019 | Karasik | |
| 10,359,303 B1* | 7/2019 | Krishnan | B60R 11/00 |
| 2012/0162428 A1* | 6/2012 | Wee | B60R 11/04 348/148 |
| 2017/0320440 A1 | 11/2017 | Boegel et al. | |
| 2018/0208016 A1* | 7/2018 | O'Brien | B60H 1/245 |
| 2020/0247329 A1* | 8/2020 | Robertson, Jr. | G02B 7/006 |
| 2020/0249329 A1* | 8/2020 | Herman | G01S 7/497 |
| 2020/0275033 A1* | 8/2020 | Petniunas | H04N 13/246 |

* cited by examiner

Primary Examiner — Jamel E Williams
(74) Attorney, Agent, or Firm — Frank A. MacKenzie; Bejin Bieneman PLC

(57) ABSTRACT

An assembly includes a housing defining a chamber. The assembly includes a sensor supported by the housing. The assembly includes a deflector forward of the sensor and having a front surface designed to direct air upward and a rear surface opposite the front surface. The housing has a vent in fluid communication with the chamber and aimed at the rear surface of the deflector.

18 Claims, 4 Drawing Sheets

VEHICLE SENSOR ASSEMBLY

BACKGROUND

A vehicle may operate in an autonomous mode, a semiautonomous mode, or a nonautonomous mode. In the autonomous mode each of a propulsion system, a braking system, and a steering system of the vehicle are controlled by a computer of the vehicle. In a semiautonomous mode the computer controls one or two of the propulsion, braking, and steering systems. In a nonautonomous mode, a human operator controls the propulsion, braking, and steering systems. The computer may control the propulsion, braking, and/or steering systems based on data from one or more sensors.

The sensors detect the external world and generate data, e.g., transmittable via a communication bus or the like to the computer. The sensors may be, for example, radar sensors, scanning laser range finders, light detection and ranging (LIDAR) devices, and image processing sensors such as cameras.

DETAILED DESCRIPTION

Figure 1:
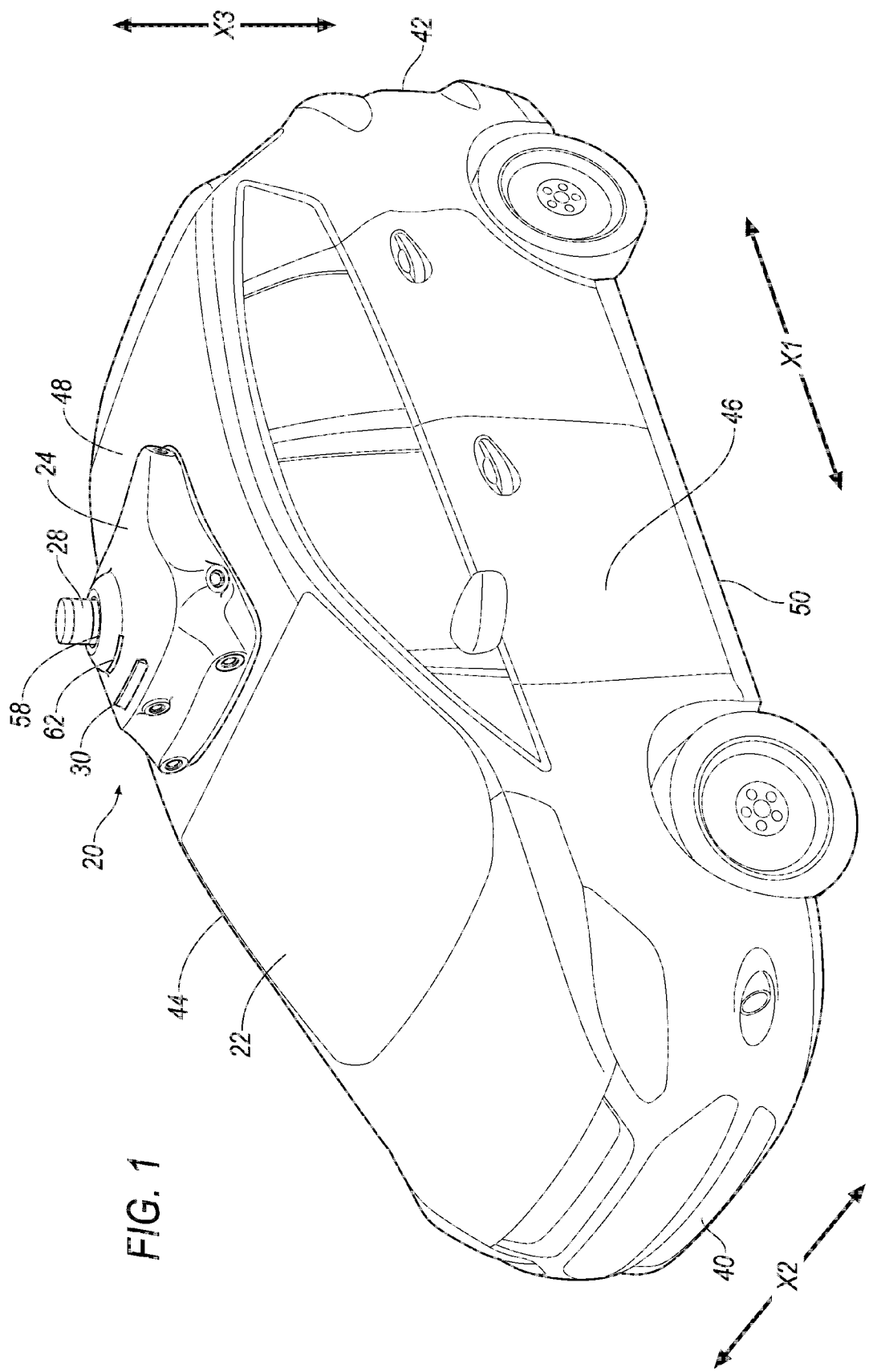
FIG. 1 is a perspective view of a vehicle having a sensor assembly.
Figure 2:
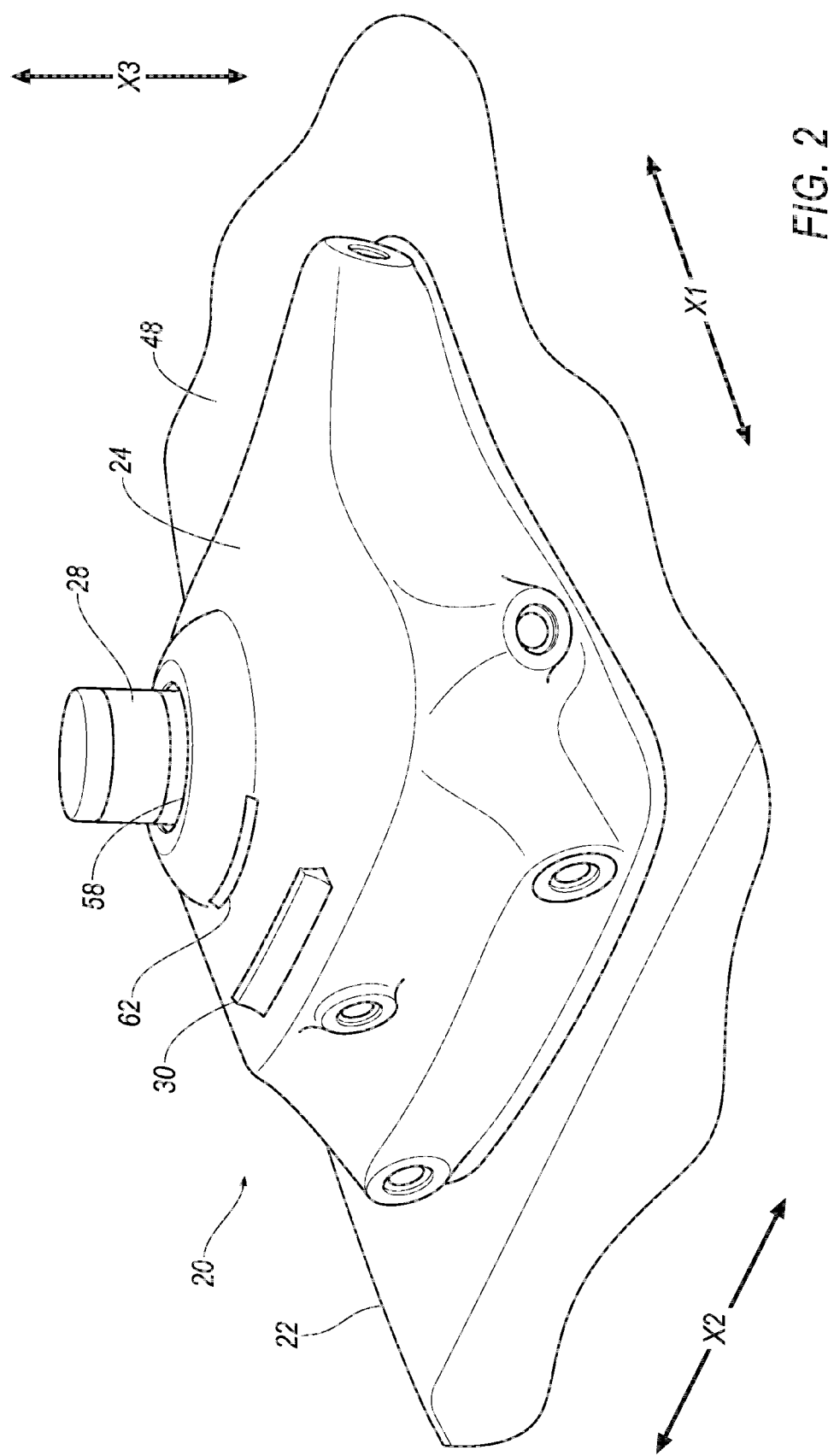
FIG. 2 is a perspective view of a roof of the vehicle and the sensor assembly.

An assembly includes a housing defining a chamber. The assembly includes a sensor supported by the housing. The assembly includes a deflector forward of the sensor and having a front surface designed to direct air upward and a rear surface opposite the front surface. The housing has a vent in fluid communication with the chamber and aimed at the rear surface of the deflector.

The deflector may extend upward from the housing.

The deflector may be elongated along a cross-vehicle axis.

The deflector may be wider than the sensor.

The housing may have a second vent in fluid communication with the chamber and aimed across the sensor.

The second vent may be between the vent and the sensor.

The housing may have an air inlet in fluid communication with the chamber.

The air inlet may be between the deflector and the sensor.

The assembly may include a second deflector in the chamber, the housing may have a second vent in fluid communication with the chamber and aimed across the sensor, and the second deflector may direct air from the air inlet toward the second vent.

The second vent may surround the sensor.

An opening of the air inlet may define a larger area than an opening of the vent.

The rear surface may be arcuate.

The deflector may be generally triangular in cross section.

The front surface and the rear surface may slope upward and rearward.

The assembly may include an air inlet and a blower configured to draw air from the air inlet and exhaust air to the vent.

The blower may be in the chamber.

The sensor may extend above the housing.

The rear surface may extend from above the vent to below the vent.

With reference to the Figures, wherein like numerals indicate like parts throughout the several views, an autonomous navigation sensor assembly 20 for collecting data to operate a vehicle 22 in an autonomous mode includes a housing 24 defining a chamber 26. The assembly 20 includes a sensor 28 supported by the housing 24. The assembly 20 includes a deflector 30 forward of the sensor 28 and having a front surface 32 designed to direct air A1 upward and a rear surface 34 opposite the front surface 32. The housing 24 has a vent 36 in fluid communication with the chamber 26 and aimed at the rear surface 34 of the deflector 30.

The deflector 30 directs air A2 from the vent 36 and ram air A1, e.g., air A1 directed at the front surface 32 of the deflector 30 via forward movement of the vehicle 22, across a field of view 38 of sensor 28. The air A1, A2 directed across the field of view 38 of the sensors 28 may maintain clarity of the field of view 38, e.g., by deflecting insects, rain, snow, debris, dust etc., away from the sensor 28 and keeping the sensor 28 clean for proper sensor vision and functioning.

The vehicle 22 may be any type of passenger or commercial vehicle such as a car, a truck, a sport utility vehicle, a crossover vehicle, a van, a minivan, a station wagon, etc. The vehicle 22 may include a passenger cabin to house occupants, if any, of the vehicle 22. The vehicle 22 may include a roof, e.g., above a passenger cabin.

The vehicle 22 defines a longitudinal axis X1, e.g., extending between a front 40 and a rear 42 of the vehicle 22. The vehicle 22 defines a cross-vehicle axis X2, e.g., extending between a right side 44 and a left side 46 of the vehicle 22. The vehicle 22 defines a vertical axis X3, e.g., extending between a top 48 and a bottom 50 of the vehicle 22. The longitudinal axis X1, the cross-vehicle axis X2, and the vertical axis X3 are perpendicular to each other. Orientation and direction relative to the autonomous navigation sensor assembly 20 are given related to when the autonomous navigation sensor assembly 20 is supported on the vehicle 22 as described below and shown in the figures.

The vehicle 22 may operate in an autonomous mode, a semiautonomous mode, or a nonautonomous mode. For purposes of this disclosure, an autonomous mode is defined as one in which each of a propulsion system, a braking system, and a steering system are controlled by a computer of the vehicle 22; in a semiautonomous mode the computer controls one or two of the propulsion system, the braking system, and the steering system; in a nonautonomous mode, a human operator controls the propulsion system, the braking system, and the steering system.

The autonomous navigation sensor assembly 20 generates data specifying an area relative to the vehicle 22 for use by the computer to operate the vehicle 22 in the autonomous mode. The autonomous navigation sensor assembly 20 may be supported by the roof of the vehicle 22, e.g., fixed to the roof via fastener or other suitable structure.

The autonomous navigation sensor assembly 20 includes one or more sensors 28 supported by the housing 24. The sensors 28 of the autonomous navigation sensor assembly 20 detect an area relative to the vehicle 22 and generate data specifying such area. The data is transmittable via a communication network or the like to the computer. The sensors 28 may be, for example, radar sensors, scanning laser range finders, a light detection and ranging (LIDAR) sensor, and image processing sensors such as cameras. Each sensor 28 may define a field of view 38. The field of view 38 of each sensor 28 is a volume relative to, and detectable, by such sensor 28. The volume may be defined by azimuth and altitude angle ranges (also referred to as horizontal FOV and vertical FOV), as well as by a depth or detection distance. Each sensor 28 may include a lens. The lens may protect components of the sensors 28, e.g., prevent debris (such as water or dirt) from contacting a detector chip (such as a CMOS, CCD, InGaAs, or other conventional chip) of the sensor 28. The lens may be transparent or semitransparent glass, plastic, or other suitable material. The lens is in the field of view 38 of the sensor 28. In other words, light may have to pass through the lens before being detected by the sensor 28. One or more of the sensors 28 may extends above the housing 24. For example, a LIDAR sensor may extend upwards from a top outer surface of the housing 24.

Figure 3:
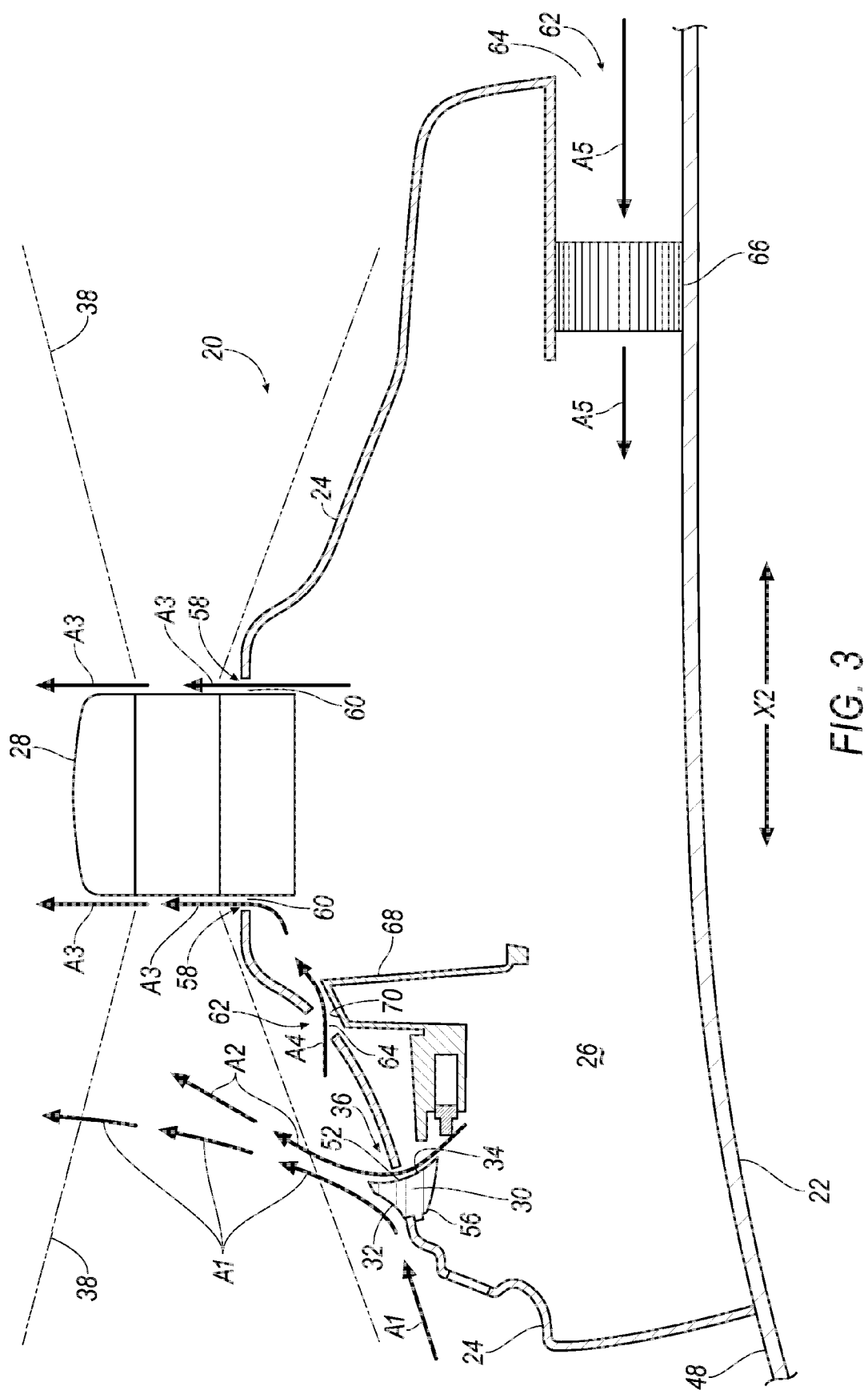
FIG. 3 is a cross section of the roof of the vehicle and the sensor assembly.
Figure 4:
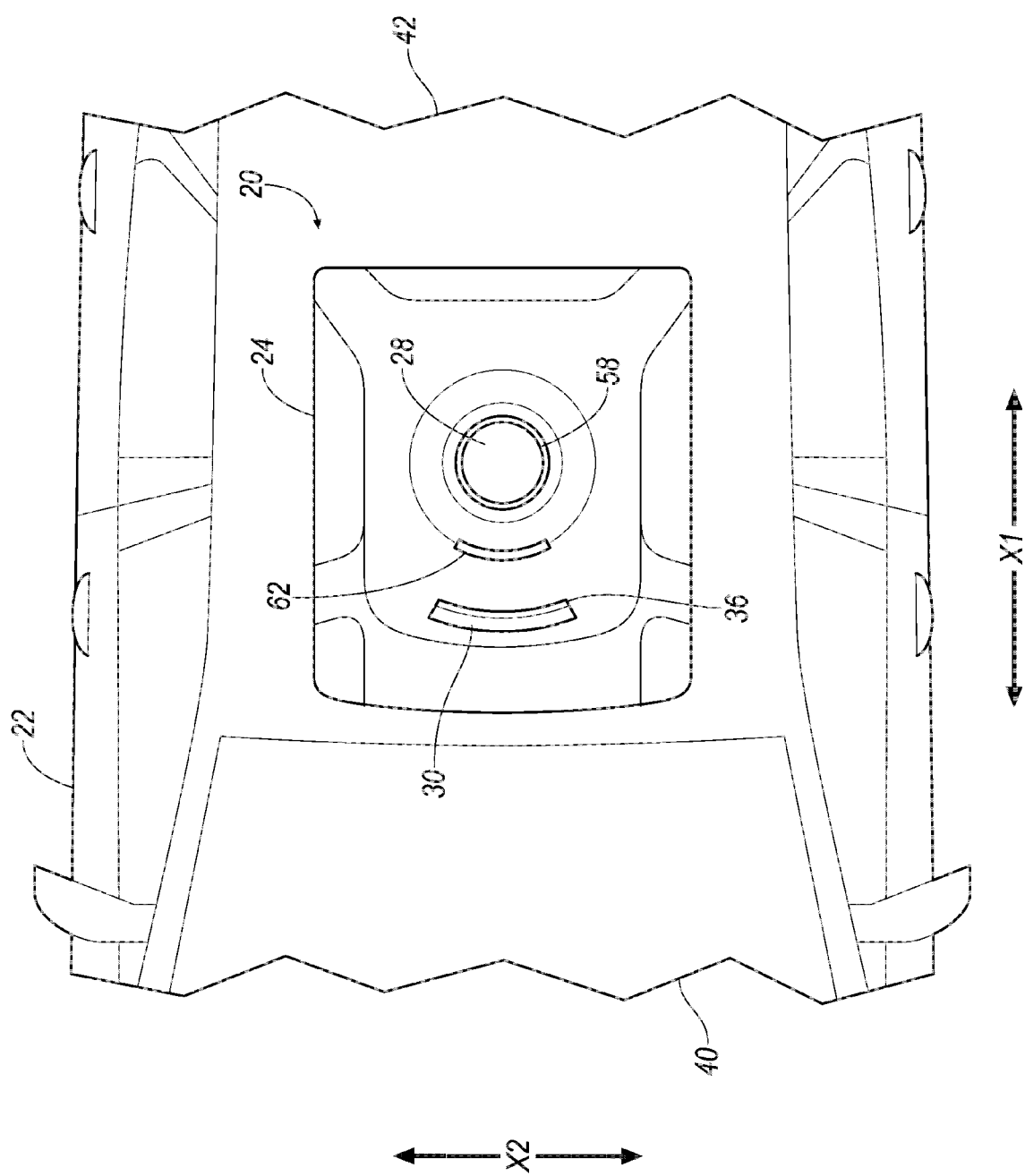
FIG. 4 is a top view of the vehicle and the sensor assembly.

The housing 24 defines the chamber 26, illustrated in FIG. 3. For example, the housing 24 may define a top and sides of the chamber 26. The vehicle 22 may further define the chamber 26. For example, the roof may define a bottom of the chamber 26.

The vent 36 of the autonomous navigation sensor assembly 20 may maintain clarity of the field of view 38 of the sensor 28, e.g., air exiting the vent 36 may redirect debris before the debris contacts the sensor 28. The vent 36 is in fluid communication with the chamber 26, i.e., such that air A2 from within the chamber 26 may flow out of the vent 36. The vent 36 may include an opening 52 in the housing 24 or other structure through which air A2 may travel. The vent 36 may include baffles that direct air (not shown).

The vent 36 is aimed at the rear surface 34 of the deflector 30. In other words, the vent 36 is configured such that air A2 exiting the vent 36 is directed from the chamber 26 toward the rear surface 34 of the deflector 30. For example, the opening 52 and the baffles may be positioned and oriented such that air A2 exiting the vent 36 contacts the rear surface 34. The vent 36, e.g., the opening 52 of the vent 36, may be elongated along the cross-vehicle axis X2. The vent 36, e.g., the opening 52 of the vent 36, may be as wide as the sensor 28 and/or the deflector 30 relative to the cross-vehicle axis X2.

The deflector 30 may maintain clarity of the field of view 38, e.g., by directing air A2 from the vent 36 and ram air A1 across the field of view 38 of sensor 28. The deflector 30 is forward of the sensor 28 relative to the longitudinal axis X1. In other words, when the autonomous navigation sensor assembly 20 is supported by the roof, the deflector 30 may be between the sensor 28 and the front 40 of the vehicle 22 relative to the longitudinal axis X1. The deflector 30 extends upward from the housing 24 relative to the vertical axis X3. For example, the deflector 30 may extend away from the top outer surface of the housing 24.

The deflector 30 may be elongated along the cross-vehicle axis X2. For example, the deflector 30 may extend between opposing distal ends spaced form each other along the cross-vehicle axis X2. The deflector 30 may be wider than the sensor 28 relative to the cross-vehicle axis X2. For example, the distal ends may be spaced from each other along the cross-vehicle axis X2 further than a diameter of the sensor 28 along the cross-vehicle axis X2.

The deflector 30 may be generally triangular in cross section, i.e., from a side view of the deflector 30 as illustrated in FIG. 3. For example, the front surface 32 may abut the rear surface 34 at a top of the deflector 30, and a bottom surface 56 of the deflector 30 may extend from a bottom of the front surface 32 to a bottom of the rear surface 34. The cross section may deviate from being perfectly triangular, for example the surfaces 32, 34, 56 may have a curvature between intersections (or corners) where the surfaces 32, 34, 56 abut, and such intersections may be chamfered or beveled.

The front surface 32 of the deflector 30 is designed to direct air A1 upward. For example, the front surface 32 may slope upward and rearward from the housing 24 and relative to the longitudinal axis X1 and the vertical axis X3. In other words, the front surface 32 at the housing 24 may be forward of, and lower than, the front surface 32 at the top 48 of the deflector 30.

The rear surface 34 of the deflector 30 is designed to direct air A2 upward, e.g., air A2 from the vent 36. The rear surface 34 is opposite the front surface 32 relative to the longitudinal axis X1. The rear surface 34 may slope upward and rearward relative to the longitudinal axis X1 and the vertical axis X3. The rear surface 34 may be arcuate. For example, the rear surface 34 may extend generally vertically at the housing 24, and curve to extend generally rearward and upward at the top 48 of the deflector 30. The rear surface 34 may extend from above the vent 36 to below the vent 36. For example, the rear surface 34 at the bottom surface 56 may be below the vent 36 and in the chamber 26, and the rear surface 34 at the top of the deflector 30 may be above and outside the chamber 26.

The housing 24 may have a second vent 58. The second vent 58 may maintain clarity of the field of view 38 of the sensor 28. The second vent 58 may be in fluid communication with the chamber 26. The second vent 58 may include an opening 60 in the housing 24 or other structure through which air A3 may travel. The second vent 58 may include baffles that direct air. The second vent 58 may be aimed across the sensor 28, i.e., aimed to direct air A3 across the lens and/or the field of view 38 of the sensor 28. Air A3 from the second vent 58 may clean the sensor 28. For example, such air A3 may urge water and other debris on the lens the sensor 28 to travel across, and off, the lens. The second vent 58 may surround the sensor 28, e.g., encircle the field of view 38 of the sensor 28. For example, the opening 60 of the second vent 58 may completely surround a perimeter of the lens. The second vent 58 may be between the vent 36 and the sensor 28, e.g., relative to the longitudinal axis X1.

The housing 24 may have one or more air inlets 62. The air inlets 62 permit air to enter the chamber 26 of the housing 24. Each air inlet 62 may include an opening 64 through which air may travel, baffles that direct the air, and/or other suitable structure. One or more air inlet 62 may be in fluid communication with the chamber 26, i.e., such that air A4 may flow from outside the chamber 26, thought the air inlet 62, and into the chamber 26. The opening 64 of the air inlet 62 may define a larger area than an opening 52 of the vent 36, e.g., such that speed of the air A2 exiting the vent 36 is faster than speed of air A4 entering the air inlet 62 for a common rate of air flow. The air inlet 62 may face forward, e.g., such that ram air A4 entering the air inlet 62 pressurizes the chamber 26. The air inlet 62 may be between the deflector 30 and the sensor 28, e.g., relative to the longitudinal axis X1.

The autonomous navigation sensor assembly 20 may include a blower 66. The blower 66 moves air A5, e.g., between an intake and an exhaust of the blower 66. The blower 66 may include an electric motor, a fan, or other suitable structure for moving air. The blower 66 may be configured to draw air from one of the air inlets 62 and exhaust air to the vent 36. For example, the intake of the blower 66 may be in fluid communication with one or more air inlet 62 and the exhaust of the blower 66 may be in fluid communication with the vent 36. The blower 66 may be in the chamber 26, e.g., fixed relative to the housing 24. In such an example, the blower 66 pressurizes the chamber 26 to expel air from the opening 52 and the opening 60. The blower 66 and the ram air intake at opening 64, in combination, pressurize the chamber 26. The opening 64 may be designed such that the pressure exterior to the opening 64 resulting in the ram air entering the opening 64 is greater than the pressure in the chamber 26. In such an example, the air enters the chamber 26 at the opening 64 even when the chamber 26 is pressurized.

The autonomous navigation sensor assembly 20 may include a second deflector 68. The second deflector 68 may direct air A4 from the air inlet toward the second vent 58. For example, the second deflector 68 may in the chamber 26 rearward of one of the air inlets 62, i.e., such that air A4 entering the air inlet 62 impacts the second deflector 68. A front surface 70 of the second deflector 68 may be sloped upward and rearward to direct air impacting the second deflector 68 toward the second vent 58.

During operation and while the vehicle 22 is traveling forward, air A1 is urged upward by the deflector 30. The air A1 may redirect objects (e.g., dirt, insects, rain, etc.) to limit interference of such objects with the sensor 28. Additionally, air A4 and air A5 entering the air inlets 62 may pressurized the chamber 62. Air A2 and air A3 from the pressurized chamber 62 may flow out of the vent 36 and the second vent 58 to further limit interference of objects with the sensor 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a housing defining a chamber;
   a sensor supported by the housing; and
   a deflector forward of the sensor and having a front surface designed to direct air upward and a rear surface opposite the front surface;
   the housing having a vent in fluid communication with the chamber and aimed at the rear surface of the deflector.

2. The assembly of claim 1, wherein the deflector extends upward from the housing.

3. The assembly of claim 1, wherein the deflector is elongated along a cross-vehicle axis.

4. The assembly of claim 1, wherein the deflector is wider than the sensor.

5. The assembly of claim 1, wherein the housing has a second vent in fluid communication with the chamber and aimed across the sensor.

6. The assembly of claim 5, wherein the second vent is between the vent and the sensor.

7. The assembly of claim 1, wherein the housing has an air inlet in fluid communication with the chamber.

8. The assembly of claim 7, wherein the air inlet is between the deflector and the sensor.

9. The assembly of claim 7, further comprising a second deflector in the chamber, wherein the housing has a second vent in fluid communication with the chamber and aimed across the sensor, and wherein the second deflector directs air from the air inlet toward the second vent.

10. The assembly of claim 9, wherein the second vent surrounds the sensor.

11. The assembly of claim 7, wherein an opening of the air inlet defines a larger area than an opening of the vent.

12. The assembly of claim 1, wherein the rear surface is arcuate.

13. The assembly of claim 1, wherein the deflector is generally triangular in cross section.

14. The assembly of claim 1, wherein the front surface and the rear surface slope upward and rearward.

15. The assembly of claim 1, further comprising an air inlet and a blower configured to draw air from the air inlet and exhaust air to the vent.

16. The assembly of claim 15, wherein the blower is in the chamber.

17. The assembly of claim 1, wherein the sensor extends above the housing.

18. The assembly of claim 1, wherein the rear surface extends from above the vent to below the vent.

* * * * *